June 18, 1929.  J. M. SKINNER  1,718,086
BATTERY ELEMENT PACKAGE
Filed Feb. 1, 1922  2 Sheets-Sheet 1
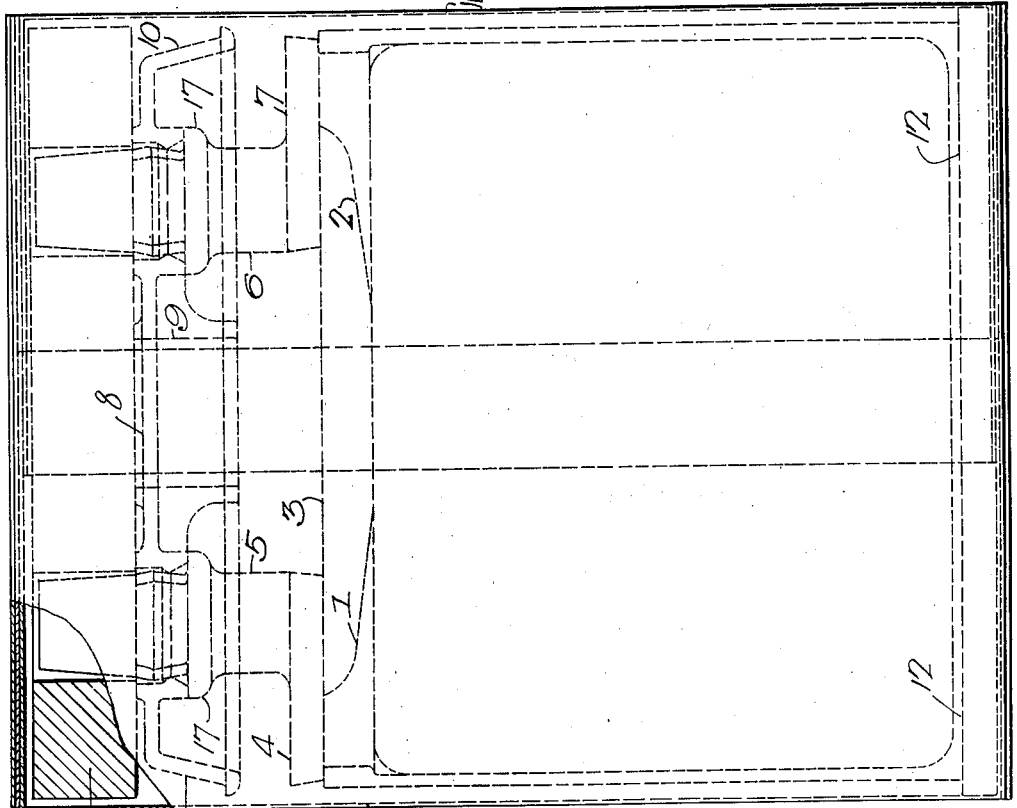
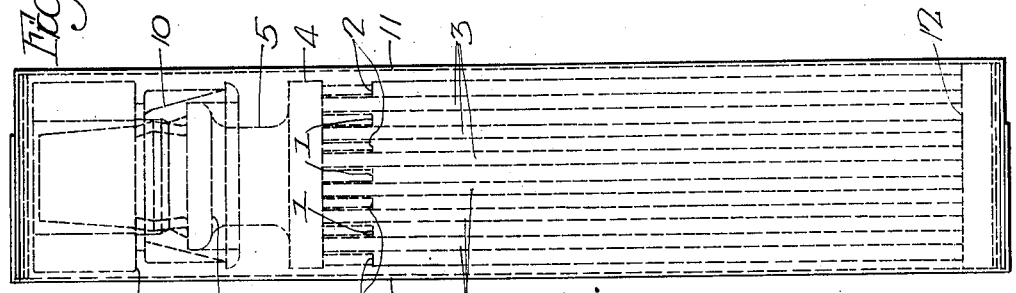
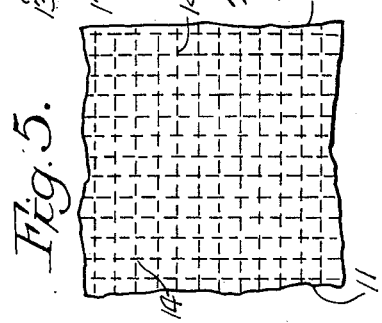
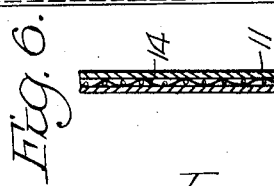
Inventor—
James M. Skinner
by his Attorneys
Howson & Howson June 18, 1929.   J. M. SKINNER   1,718,086
BATTERY ELEMENT PACKAGE
Filed Feb. 1, 1922   2 Sheets-Sheet 2
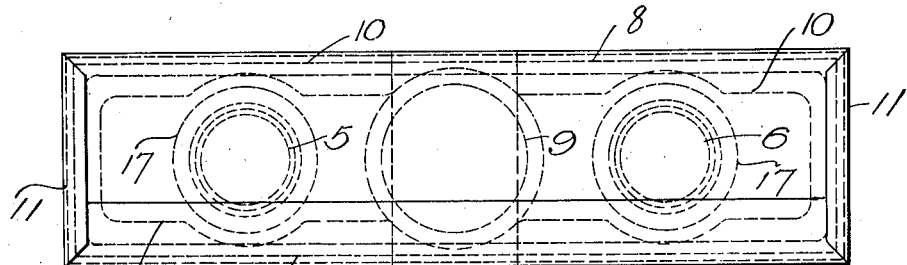
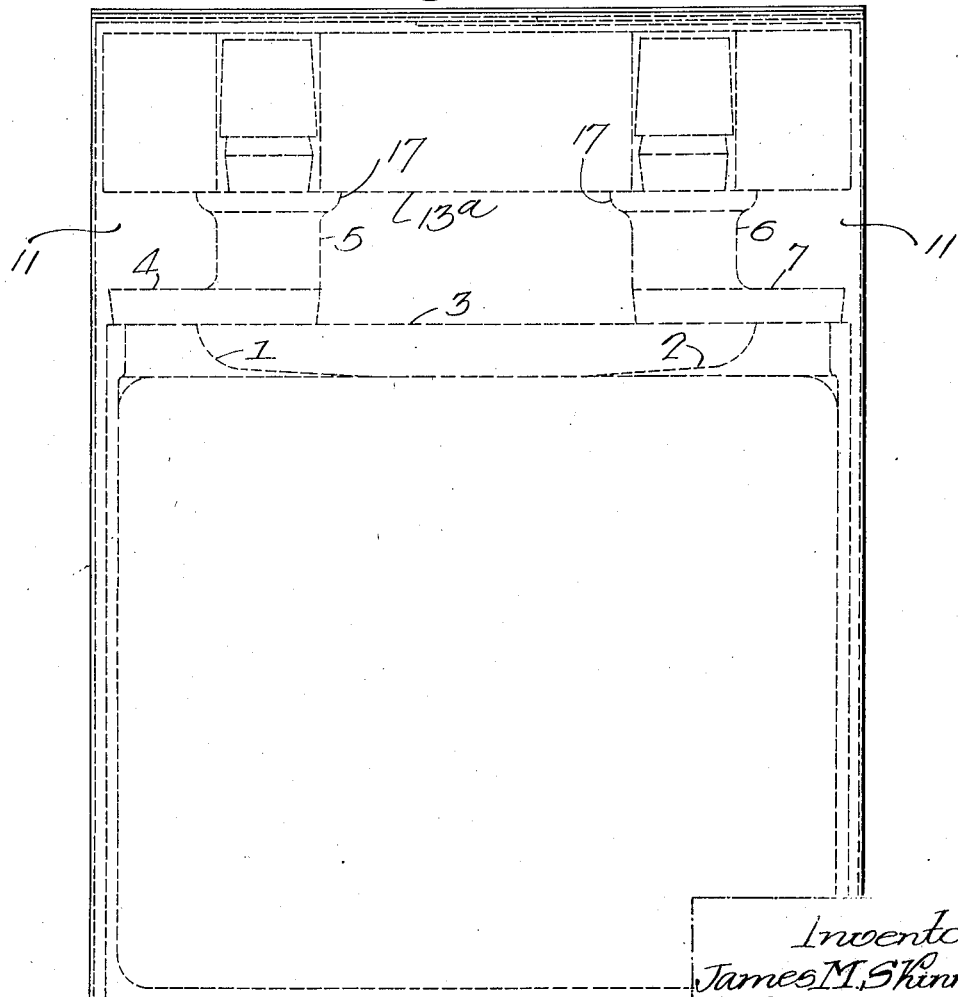

Patented June 18, 1929.

1,718,086

UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-ELEMENT PACKAGE.

Application filed February 1, 1922. Serial No. 533,211.

One object of this invention is to provide a simple, inexpensive and substantial container or package for inclosing and protecting one or more plate-and-separator elements of a storage battery during transportation and storage, the invention contemplating especially the packaging of assembled and preferably charged renewal elements ready to be placed and sealed in storage battery jars or containers for use.

A further object of the invention is to provide a novel shipping container for hermetically inclosing plate-and-separator elements of a storage battery with a view to preventing or materially retarding chemical or physical changes in the plates and plate insulators, or separators, such as might occur by the loss of moisture from wet treated wood separators or by oxidation or other atmospheric action on said separators or on the plates, especially where charged negative plates are used.

The invention further contemplates the provision of means for minimizing the likelihood of certain projecting parts of the element wearing or breaking through the material of the package, together with means for properly spacing, supporting and protecting the parts of the element within the package.

In one of its forms the invention also is designed to include means for preventing the occurrence of electro-chemical action within the package due to metallic electrical connection of certain of the parts of the plate-and-separator element which might otherwise occur.

These objects and other advantageous ends I attain as hereinafter set forth, reference being had to the accompanying drawings, in which, Fig. 1 is a side elevation partly in vertical section, illustrating my invention as applied to a plate-and-separator element complete, with the cover in place;

Figs. 2 and 3 are respectively an end elevation and a plan of the package and element shown in Fig. 1;

Fig. 4 is a side elevation, illustrating my invention as applied to a plate-and-separator element from which the cell cover has been omitted, and Figs. 5 and 6 are respectively a fragmentary elevation and a vertical section illustrating the detail construction of the material employed in connection with one form of my invention.

For conveniently transporting and storing the inner parts of a storage battery, these are assembled in what may be descibed as a plate-and-separator element, consisting of a series of positive plates 1, a series of negative plates 2 alternated with said positive plates, and plate insulators 3 between each adjacent pair of said plates. All of the positive plates are connected to a strap 4 from which a terminal post 5 projects upwardly and a similar post 6 likewise projects from a second strap 7 connecting all of the negative plates 2. Each of the posts 5 and 6 in the case illustrated has a flange or annular shoulder 17. As illustrated in Figs. 1 and 2, said posts project through and serve to support a hard rubber or other battery cell cover 8 which makes a liquid-proof connection with them by the means and in the manner described and claimed in Patent No. 1,371,894, dated March 15, 1921. The cover 8 is provided with a central flanged filling opening 9 and has a marginal flange 10 for the reception of sealing compound when the element is finally placed in a jar or other container for use.

In order to make possible the safe shipment of such a plate-and-separator element as that described and to protect its plates and plate insulators from deterioration or change from the effects of the oxygen of the atmosphere, or from drying out where wet, treated wood separators are used for plate insulators, I preferably inclose said element in a package which in that form of the invention shown in Figs. 1 to 3, inclusive, consists of a closed bag or container of reinforced, air-proof paper indicated at 11, having a substantially rectangular section and preferably, though not necessarily, containing in its bottom portion a block or pad of wood 12 on which rests the plate-and-separator element. This wooden plate has a length substantially equal to the width of the element and a breadth equal to the combined thicknesses of the positive and negative plates and plate insulators of said element.

In order to maintain the correct spacing of the terminal posts 5 and 6 and to keep them from breaking through the paper container, as well as for protecting angular portions of the plate-and-separator element, I mount on said posts a wooden block 13 having the same superficial dimensions as the bottom plate or block 12 and of such a thickness as to cause it to project to or slightly above the top ends of the posts when its lower surface rests upon the flanges surrounding the post openings of the cell cover 8.

After the supporting block 12 and the plate-and-separator element with the block 13 have been placed within the package 11, the top portion of the latter is closed by folding its parts one over the other after the application thereto of suitable sealing material, so that after having been assembled as above described, the plate-and-separator element is hermetically inclosed.

The material of which the package is made preferably consists of one or more layers of structurally strong paper rendered water and air-proof by a layer of suitable water-proof material such as asphaltum, paraffine, water-proof varnish, water-proof glue, or the like. Moreover, the walls of the package may be reinforced in any desired manner as by a layer of suitable fabric 14 cemented to the paper or interposed between paper layers which are cemented together by a layer of adhesive and water-poofing material.

With the above described arrangement of parts it is apparent that the completed and sealed package is flat-sided and rectangular in section, either horizontally or vertically. Not only does it protect the wooden separators and battery plates from drying out and from oxidation by preventing the free access of the air, but with the blocks 12 and 13 it protects them mechanically. The blocks 12 and 13 serve also as absorption and cushioning pads, absorbing any excess moisture that comes out of the element and cushioning it against vibration and shocks. Moreover, with such a package I may transport, store, or otherwise keep the plate-and-separator element with a substantial proportion of the active material of the plates in a charged condition, and also maintain the wooden plate insulators in a moist condition if desired.

When the element is desired for use the wrapper 11 may be removed and after the removal of the block 13 the element as a whole may be placed in a suitable service container or jar, whereupon, after suitable sealing compound has been applied between the container walls and the flange 10 of the cover 8, electrolyte may be added and the completed cell started in service.

As shown in Fig. 4, in some instances I may omit the cell cover as a part of the plate-and-separator element, in which case the block 13ª rests upon the flanges 17 of the terminal posts and is of a thickness sufficient to cause its top surface to project flush with or slightly above the upper ends of said posts.

I claim:

1. The combination of a battery plate-and-separator element including terminal posts; a temporary container hermetically inclosing said element; and a terminal post blocking of substantially the same general shape as the bottom of the element.

2. The combination of a battery plate-and-separator element including terminal posts; a temporary container hermetically inclosing said element; with a member within the container engaging the terminal posts to hold them and their associated parts in definite positions, and formed to build out the upper part of the element to give it a substantially rectangular form.

3. The combination of a battery plate-and-separator element including terminal posts; a cell cover mounted on said terminal posts; a block above the cell cover; the bottom of the plate-and-separator element and the top of the block having substantially the same horizontal cross section; with a temporary container hermetically inclosing said element with the block.

4. A battery element package including a battery plate-and-separator element and a wrapper therefor made of paper coated with a water-proof bituminous material.

5. A battery element package including a battery plate-and-separator element and a wrapper therefor made of water-proofed paper and a reinforcing material.

6. A battery element package including a battery plate-and-separator element and a wrapper therefor, consisting of paper and a reinforcing fabric with a water-proof material uniting said paper and fabric.

JAMES M. SKINNER.